United States Patent [19]

Niwa et al.

[11] Patent Number: 4,652,955

[45] Date of Patent: Mar. 24, 1987

[54] MULTI-HEAD TRANSDUCER ASSEMBLY FOR HELICAL SCAN VIDEO TAPE RECORDERS

[75] Inventors: Kazuhiro Niwa; Masaharu Tsunekawa; Atsushi Nei, all of Yokohama, Japan

[73] Assignee: Victor Company of Japan, Ltd., Japan

[21] Appl. No.: 705,602

[22] Filed: Feb. 26, 1985

[30] Foreign Application Priority Data

Feb. 29, 1984 [JP] Japan .................................. 59-36269

[51] Int. Cl.⁴ ........................ G11B 5/265; G11B 5/187
[52] U.S. Cl. ..................................... 360/121; 360/122
[58] Field of Search ................................. 360/121, 122

[56] References Cited

U.S. PATENT DOCUMENTS

| | | |
|---|---|---|
| 3,846,819 | 11/1974 | Warren . |
| 3,978,523 | 8/1976 | Tanaka et al. ........................ 360/121 |
| 4,107,751 | 8/1978 | Shimoda ............................... 360/122 |
| 4,393,428 | 7/1983 | Fujimura . |

FOREIGN PATENT DOCUMENTS

| | | |
|---|---|---|
| 3104930 | 1/1982 | Fed. Rep. of Germany . |
| 8221190 | 7/1983 | France . |
| 56-25223 | 3/1981 | Japan .................................. 360/121 |
| 57-172523 | 10/1982 | Japan .................................. 360/121 |
| 2070842 | 9/1981 | United Kingdom . |
| 2099204 | 12/1982 | United Kingdom ................. 360/121 |
| 2113896 | 8/1983 | United Kingdom . |

OTHER PUBLICATIONS

Patent Abstracts of Japan, vol. 7, No. 216, Sep. 24th, 1983, p. (P-225) (1361); & JP-A-58-111120 (Sony) 02-07-1983.

*Primary Examiner*—Stuart N. Hecker
*Assistant Examiner*—Alyssa H. Bowler
*Attorney, Agent, or Firm*—Lowe, Price, Leblanc, Becker & Shur

[57] ABSTRACT

An electromagnetic transducer assembly for a helical-scan type video tape recorder comprises a nonmagnetic base, and a pair of magnetic heads secured to the base and successively arranged in spaced relationship with each other in the direction of transport of a magnetic medium, each of the heads comprising a generally U-shaped core having a pair of limb portions and a web portion therebetween, a generally I-shaped core connected to the limb portions to form a closed magnetic circuit having a magnetic gap therein, and a coil wound on the closed magnetic circuit. The I-shaped cores of the heads respectively have arcuately shaped edge portions adjacent the magnetic gaps and opposed to each other across the space between the heads to eliminate the creation of false magnetic gap effect.

4 Claims, 3 Drawing Figures

MULTI-HEAD TRANSDUCER ASSEMBLY FOR HELICAL SCAN VIDEO TAPE RECORDERS

BACKGROUND OF THE INVENTION

The present invention relates generally to electromagnetic transducers, and more particularly to a multi-head video transducer assembly of helical scan type video tape recorders.

Multi-head magnetic transducer assemblies are currently employed in helical scan video tape recorders to effect still-picture or slow-motion playback. Such multi-head transducer assemblies comprise a pair of magnetic heads secured to a base and arranged successively in spaced relationship in the direction of transport of the magnetic tape. Each head has a generally U-shaped core and an I-shaped core connected to the limb portions of the U-shaped core to form a closed magnetic circuit with a magnetic gap therein. The heads are arranged so that the I-shaped core of each head is located in opposition to the I-shaped core of the other head. The opposed portions of the I-shaped cores adjacent the magnetic gaps respectively have right-angled edges which run parallel with the magnetic gaps.

However, it has been difficult to obtain satisfactory image quality on such special mode playback.

SUMMARY OF THE INVENTION

The present invention is based on the discovery that the image quality is subject to degradation from crosstalk between the paired transducer heads due to the creation of false magnetic gaps at the sharp edge portions of the I-shaped cores.

The present invention contemplates to shape the opposed edge portions of the I-shaped cores adjacent the magnetic gaps so that they present round surfaces to the magnetic medium. The rounded edge portions eliminate the magnetic gap effect of the conventional multi-head transducer assembly and ensures excellent image quality.

Another factor that affects image quality is found to be the result of radio interference. According to another feature of the invention, the coil of each head is wound both on the web portion of the U-shaped core and on the I-shaped core. The ratio of coil turns on the U-shaped core to coil turns on the I-shaped core is proportional to the ratio of the transverse cross-sectional area of the I-shaped core to the transverse cross-sectional area of the web portion of the U-shaped core. As a result, radio interference noise introduced to the U-shaped core is cancelled with the noise introduced to the I-shaped core.

BRIEF DESCRIPTION OF THE DRAWINGS

The present invention will be described in further detail with reference to the accompanying drawings, in which.

DETAILED DESCRIPTION

Figure 1:
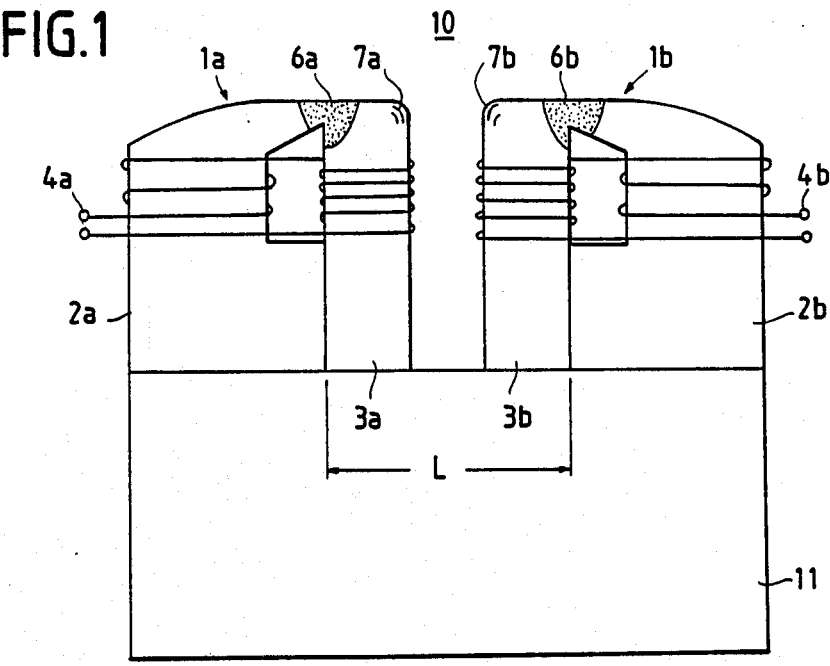
FIG. 1 is a plan view of a video transducer assembly of the invention for use in helical scan video tape recorders.

In FIG. 1, a video transducer assembly of the invention, generally shown at 10, comprises a mount or head base 11 of nonmagnetic material, and a pair of electromagnetic transducer heads 1a and 1b firmly secured to the base 11. As shown in FIG. 1, the base 11 is secured in place to the rotary cylinder of a helical scan type video tape recorder between upper and lower drum halves 12 and 13 to expose the head 10 slightly beyond the circumference of the cylinder. In a well known manner, another transducer assembly of similar construction is mounted on a diametrically opposite position of the rotary cylinder.

Figure 2:
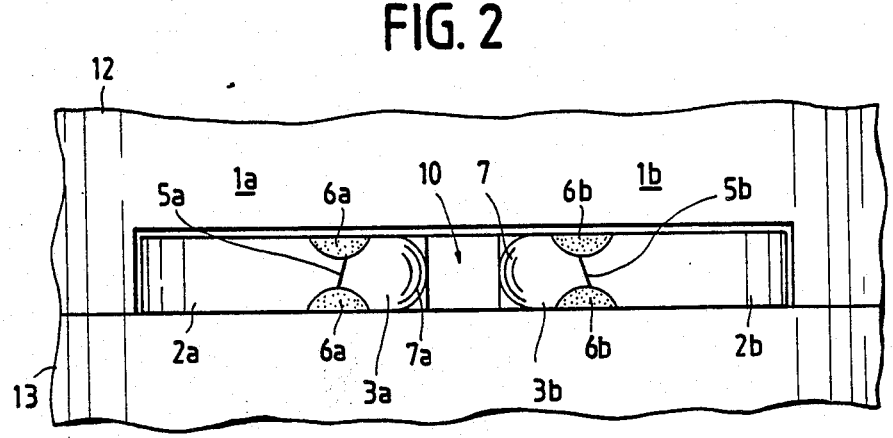
FIG. 2 is a side view of the transducer assembly of FIG. 1.
Figure 3:
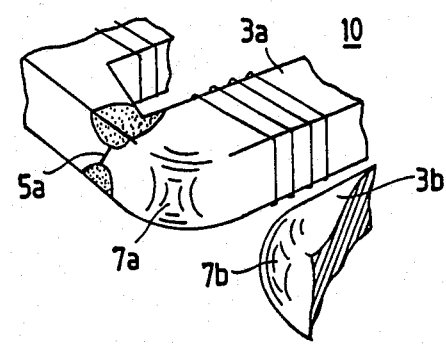
FIG. 3 is a perspective view of a portion of the transducer assembly.

Each head comprises a generally U-shaped ferromagnetic core 2 and I-shaped ferromagnetic core 3 secured to the front and rearside limb portions of the U-shaped core. As seen in FIGS. 1 to 3, the front limb of each U-shaped core is tapered and arcuately recessed at the end thereof and the front end portion of each I-shaped core is also arcuately recessed to form a tapered portion to form a magnetic gap 5. The reason for this is to provide concentration of magnetic flux lines across the magnetic gaps 5a, 5b. As seen in FIG. 2, the magnetic gap 5a is inclined to the vertical in a direction opposite to the inclination of magnetic gap 5b to the vertical. The recessed portions of the U- and I-shaped cores are filled with fused glass shown at 6a, 6b to precisely define the gap length.

The magnetic heads 1a and 1b are laterally spaced apart so that the distance L between magnetic gaps 5a and 5b is preferably equal to 1 millimeter or less. To ensure this amount of spacing, the transverse dimension of each I-shaped core is smaller than the transverse dimension of the web portion of each U-shaped core. A coil 4a is wound on the web portion of U-shaped core 2a and further wound on I-shaped core 3a. Likewise, a coil 4b is wound on the web portion of U-shaped core 2b and further wound on I-shaped core 3b. During recording, a specified one of the heads is used to record a video program and the same head is used on playback. During special mode of operation such as still-picture and slow-motion, the other head is additionally brought into play.

According to the invention, I-shaped cores 3a and 3b respectively have rounded front edge portions 7a and 7b to keep the edge portions from sharply contacting the magnetic tape being transported. These round shaped edge portions are thus rendered unparallel with the magnetic gaps 5a, 5b. This results in the elimination of the magnetic gap effect which would otherwise be produced by sharp edges parallel to the magnetic gaps.

Each of the windings 4a and 4b has N1 turns on U-shaped core and N2 turns on I-shaped core. To avoid radio interference, the turn ratio N1/N2 is preferably proportional to the ratio S2/S1, where S1 and S2 represent respectively the cross-sectional area of the magnetic circuit on the web portion of each U-shaped core (which corresponds to the area of contact of the U-shaped core with the magnetic tape) and the cross-sectional area of magnetic circuit on the I-shaped core (which corresponds to the area of contact of I-shaped core with the magnetic tape). Since the strength of radio interference noise produced is proportional to the core's cross-sectional area, radio interference noise introduced to the U-shaped core is cancelled with that introduced to the I-shaped core. The provision of the windings on both cores also raises the output level of the head without substantially increasing thermal noise due to the resistive component of the coils.

Experiments showed that crosstalk between heads 1a and 1b was improved by approximately 6 dB and the output level was increased by approximately 3 dB.

What is claimed is:

1. An electromagnetic transducer assembly adapted to be mounted on a rotary cylinder of a helical-scan type video tape recorder, comprising:
   a nonmagnetic base; and
   a pair of magnetic heads secured to said base and successively arranged in spaced relationship with each other in a direction in which a magnetic medium is to be scanned by said heads, each of the heads comprising a generally U-shaped core having a pair of limb portions and a web portion therebetween, a generally I-shaped core connected to said limb portions to form a closed magnetic circuit having a magnetic gap therein, and a coil wound on said closed magnetic circuit, the I-shaped cores of said heads respectively having arcuately shaped edge portions and opposed to each other across the space between said heads.

2. An electromagnetic transducer assembly as claimed in claim 1, wherein the coil of each of said heads is wound on the web portion and the I-shaped core, the ratio of coil turns on said web portion to coil turns on the I-shaped core being proportional to the ratio of the transverse cross-sectional area of said I-shaped core to the transverse cross-sectional area of said web portion.

3. An electromagnetic transducer as claimed in claim 2, wherein the transverse cross-sectional area of said I-shaped core is smaller than the transverse cross-sectional area of said web portion.

4. An electromagnetic transducer as claimed in claim 1, wherein the azimuths of said magnetic gaps differs from each other.

* * * * *